United States Patent
Bhatia et al.

(10) Patent No.: US 12,363,063 B2
(45) Date of Patent: Jul. 15, 2025

(54) DYNAMIC IMPLEMENTATION AND TEAR-DOWN OF HARDWARE NETWORK ADDRESS TRANSLATION PIPELINES FOR A DATAFLOW

(71) Applicant: Arista Networks, Inc., Santa Clara, CA (US)

(72) Inventors: Navdeep Bhatia, Mountain View, CA (US); Sebastiano Borgione, Seattle, WA (US); Prasanna Parthasarathy, Cupertino, CA (US); Michael Chih-Yen Wang, British Columbia (CA)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 18/535,067

(22) Filed: Dec. 11, 2023

(65) Prior Publication Data

US 2025/0193147 A1    Jun. 12, 2025

(51) Int. Cl.
| | |
|---|---|
| G06F 15/16 | (2006.01) |
| G06F 9/54 | (2006.01) |
| H04L 29/06 | (2006.01) |
| H04L 61/255 | (2022.01) |
| H04L 61/2557 | (2022.01) |

(52) U.S. Cl.
CPC ........ H04L 61/2557 (2013.01); H04L 61/255 (2013.01)

(58) Field of Classification Search
CPC .......................... H04L 61/2557; H04L 61/255
USPC .............................................. 709/245
See application file for complete search history.

(56) References Cited

U.S. PATENT DOCUMENTS

| | | | |
|---|---|---|---|
| 10,263,911 B2* | 4/2019 | Xiang | H04L 47/781 |
| 10,701,139 B2* | 6/2020 | Li | H04L 41/0893 |
| 11,397,605 B2* | 7/2022 | Miyakoshi | H04L 43/0876 |
| 2009/0285198 A1* | 11/2009 | Schwartz | H04L 12/66 370/352 |
| 2011/0182290 A1* | 7/2011 | Perkins | H04L 43/028 370/389 |
| 2014/0068044 A1* | 3/2014 | McKinney | H04L 67/14 709/223 |
| 2016/0105332 A1* | 4/2016 | Xiang | H04L 67/10 709/226 |
| 2016/0212017 A1* | 7/2016 | Li | H04L 41/5048 |

(Continued)

Primary Examiner — Hamza N Algibhah
(74) Attorney, Agent, or Firm — Tianyi He (57) ABSTRACT

Operations include: identifying a first dataflow associated with a particular communications protocol; evaluating the first dataflow to determine that the first dataflow meets a hardware-based Network Address Translation (NAT) usage criteria; responsive to determining that the first dataflow meets the hardware-based NAT usage criteria, executing a set of hardware-based NAT operations to process a first set of packets corresponding to the first dataflow; identifying a second dataflow associated with the same particular communications protocol; evaluating the second dataflow to determine that the second dataflow does not meet the hardware-based NAT usage criteria; and responsive to determining that the second dataflow does not meet the hardware-based NAT usage criteria, executing a first set of software-based NAT operations to process a second set of packets corresponding to the second dataflow.

20 Claims, 5 Drawing Sheets

(56) References Cited

U.S. PATENT DOCUMENTS

| | | | | |
|---|---|---|---|---|
| 2016/0381150 A1* | 12/2016 | Rajagopal | ............... | H04L 41/40 |
| | | | | 709/223 |
| 2017/0288971 A1* | 10/2017 | Jayaraman | .......... | H04L 41/5051 |
| 2018/0004563 A1* | 1/2018 | Miyazaki | ............. | G06F 9/5077 |
| 2018/0011730 A1* | 1/2018 | Zembutsu | .......... | H04L 41/0836 |
| 2018/0146031 A1* | 5/2018 | Li | ....................... | H04L 41/5009 |
| 2018/0181424 A1* | 6/2018 | Gokurakuji | ........... | G06F 9/5077 |
| 2019/0058670 A1* | 2/2019 | Zhu | .................... | H04L 12/6418 |
| 2019/0089588 A1* | 3/2019 | Xu | ....................... | H04L 49/253 |
| 2019/0089780 A1* | 3/2019 | Yousaf | ............... | G06F 9/45533 |
| 2019/0104182 A1* | 4/2019 | Elzur | ................... | H04L 67/125 |
| 2019/0363924 A1* | 11/2019 | Tse | ....................... | G06F 9/5077 |
| 2019/0379600 A1* | 12/2019 | Bisht | .................. | H04L 61/2521 |
| 2021/0099388 A1* | 4/2021 | Abhigyan | .............. | H04L 45/56 |
| 2022/0158910 A1* | 5/2022 | Santos | ............... | H04L 41/5009 |
| 2022/0225170 A1* | 7/2022 | Xia | .................... | H04L 41/0895 |
| 2022/0329495 A1* | 10/2022 | Xie | ........................ | H04L 41/40 |
| 2023/0148302 A1* | 5/2023 | Ping | ..................... | H04W 24/02 |
| | | | | 370/254 |
| 2023/0217362 A1* | 7/2023 | Sharma | ................ | H04W 24/02 |
| | | | | 370/329 |
| 2023/0261950 A1* | 8/2023 | Xie | ...................... | H04L 41/342 |
| | | | | 709/222 |
| 2023/0336472 A1* | 10/2023 | Huang | ............... | H04L 61/2553 |

\* cited by examiner

DYNAMIC IMPLEMENTATION AND TEAR-DOWN OF HARDWARE NETWORK ADDRESS TRANSLATION PIPELINES FOR A DATAFLOW

TECHNICAL FIELD

The present disclosure relates to the dynamic implementation and tear-down of hardware network address translation (NAT) pipelines for a dataflow.

BACKGROUND

A dataflow refers to an exchange of data between a pair of devices. A subset of the data corresponding to a unit of transmission is referred to as a packet. A packet includes information that is transmitted together as a single addressable unit. A packet may include a header and a payload. The header may include control information characterized by a 5-tuple including source Internet Protocol (IP) address, source port, destination IP address, destination port, and transport protocol.

A pair of devices, exchanging packets corresponding to a dataflow, may each be connected to different respective networks. Each device may be associated with a unique network address within the respective network. A device that is connected to a public network such as the Internet may be associated with a public IP address that is addressable by any other device in (a) the public network or (b) a private network that is connected to the public network. A device connected to a private network may be associated with a private IP address that is not addressable by a device outside of that private network such as devices on the public network or in other private networks. A source device, outside of a private network, may communicate with a destination device within the private network by addressing packets to a public IP address of a network device operating as a gateway device for the private network. The gateway device then forwards the packet, from the source device outside of the private network to the destination device, inside the private network. The gateway device may also forward packets from the device within the private network to devices outside of the private network. Examples of gateway devices include, but are not limited to, routers and firewalls.

Network Address Translation (NAT) is a method used by network devices, such as routers and firewalls, to translate network address information in packet headers while the packets are in transit from a source device to a destination device. NAT may be used by a network device to translate network addresses (for example, IP addresses) for packets being transmitted between different networks.

Software-based NAT techniques are typically performed using a network device's CPU, based on software NAT tables. While software-based NAT techniques can generally handle translations for any number of dataflows, software-based NAT operations typically have longer latency than hardware-based NAT operations.

Hardware-based NAT operations or hardware NAT pipelines use dedicated hardware components to perform NAT operations. The hardware components may include, for example, Application-Specific Integrated Circuits (ASICs). Hardware-based NAT operations are typically faster than software-based NAT operations. Furthermore, hardware-based NAT operations offload a portion of the network address translation workload from a network device's CPU. Notably, however, hardware-based NAT operations are generally limited in scale due to hardware resource limitations.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. NAT ENGINE SELECTION ARCHITECTURE
3. DYNAMICALLY SWITCHING BETWEEN SOFTWARE AND HARDWARE NAT ENGINES FOR EXECUTION OF NAT OPERATIONS FOR A DATAFLOW
4. PER-PIPELINE PROGRAMMING FOR HARDWARE NAT PIPELINES
5. HARDWARE OVERVIEW
6. MISCELLANEOUS; EXTENSIONS

1. General Overview

One or more embodiments dynamically switch between using hardware-based Network Address Translation (NAT) operations and software-based NAT operations for processing packets associated with a particular dataflow, based on the changing characteristics of the particular dataflow, hardware resource availability, and/or overall NAT load. A system, such as a router or firewall, may switch from using software-based NAT operations to using hardware-based NAT operations for processing packets associated with a particular dataflow in response to, for example, detecting an increase in the number of packets being transmitted for the particular dataflow. The system may also switch from using hardware-based NAT operations to using software-based NAT operations in response to detecting a decrease in the number of packets transmitted for the particular dataflow. The system dynamically switches between using hardware-based NAT operations and software-based NAT operations for executing NAT operations for a dataflow without terminating or pausing a communication session corresponding to the dataflow.

The system may use an asymmetric configuration where packets being transmitted in one of ingress and egress directions with respect to a private network cloud are processed using hardware-based NAT operations and packets being transmitted in the other of ingress and egress directions are processed using software-based NAT operations. In one example, the system may implement a hardware NAT pipeline for egress packets of a dataflow while delaying the implementation of a hardware NAT pipeline for ingress packets of the same dataflow. These ingress packets are initially processed using software-based NAT operations, and later processed using hardware-based NAT operations. In another example, asymmetric configuration is permanently implemented for the dataflow based on the respective characteristics of the ingress packets and the egress packets.

The factors for selecting software-based NAT operations or hardware-based NAT operations for a dataflow include, but are not limited to, a detected number of packets transmitted in a prior time period, a number of packets predicted for transmission during a future time period, a ranking associated with the dataflow, a hardware resource availability for implementing hardware-based NAT operations, a recency of packet transmissions associated with the dataflow, a priority level associated with the dataflow, a source device associated with the dataflow, a destination device associated with the dataflow, a user associated with the dataflow, a data type associated with the dataflow, a latency requirement associated with the dataflow, a Quality of Service (QOS) requirement associated with the dataflow, a traffic classification of the data associated with the dataflow, a data loss sensitivity associated with the dataflow, an application context associated with the dataflow, a compliance requirement associated with the dataflow, a traffic shaping technique associated with the dataflow, a security protocol associated with the dataflow, or an overall NAT load across active dataflows.

The system may periodically re-evaluate existing dataflows to determine whether to switch between the use of hardware-based NAT operations and software-based NAT operations. Alternatively, or additionally, the system may re-evaluate existing dataflows in response to triggering events for initiating the re-evaluation process. As an example, a change in data traffic conditions that meets one or more re-evaluation criteria may trigger the re-evaluation process. In another example, a NAT entry in a hardware NAT table may timeout resulting in hardware availability for adding new NAT entries to the hardware NAT table.

Hardware-based NAT operations may be executed using a hardware NAT pipeline. A hardware NAT pipeline, as referred to herein, may be characterized by a dedicated processing path within a networking device that is configured for NAT operations. The hardware NAT pipeline uses dedicated hardware components to perform hardware-based NAT operations.

One or more embodiments implement per-pipeline programming for a system that implements multiple hardware NAT pipelines. In an example scenario for implementing per-pipeline programming, the system (a) adds NAT entries for a dataflow to a hardware NAT table corresponding to a particular hardware NAT pipeline being used to process packets associated with the dataflow and (b) refrains from adding NAT entries for the dataflow to other hardware NAT tables corresponding to other hardware NAT pipelines that are not being used to process packets associated with the dataflow. In another example, a system may initially implement multiple hardware NAT pipelines for the ingress packets of a particular dataflow, when the actual hardware NAT pipeline that is to be used for the ingress packets is unknown. Later, when the actual hardware NAT pipeline being used for the ingress packets has been identified, the NAT entries for processing the ingress packets are removed from the NAT tables for any hardware NAT pipelines that are not being used for processing the ingress packets.

One or more embodiments described in this Specification and/or recited in the claims may not be included in this General Overview section.

2. NAT Engine Selection Architecture

In one or more embodiments, the NAT engine selection architecture is designed to configure and/or efficiently use limited-availability hardware NAT pipelines that may be faster at performing NAT operations than a software-based NAT engine. The NAT engine selection architecture may select a subset of active dataflows for processing using the hardware NAT pipelines. As an example, hardware NAT pipelines may be selected for processing dataflows with a large number of packets and/or dataflows associated with a high priority level compared to other dataflows. Embodiments described herein dynamically implement and teardown hardware NAT pipelines for dataflows based at least on the changing characteristics of the dataflows, hardware resource availability, and/or overall NAT load.

Figure 1:
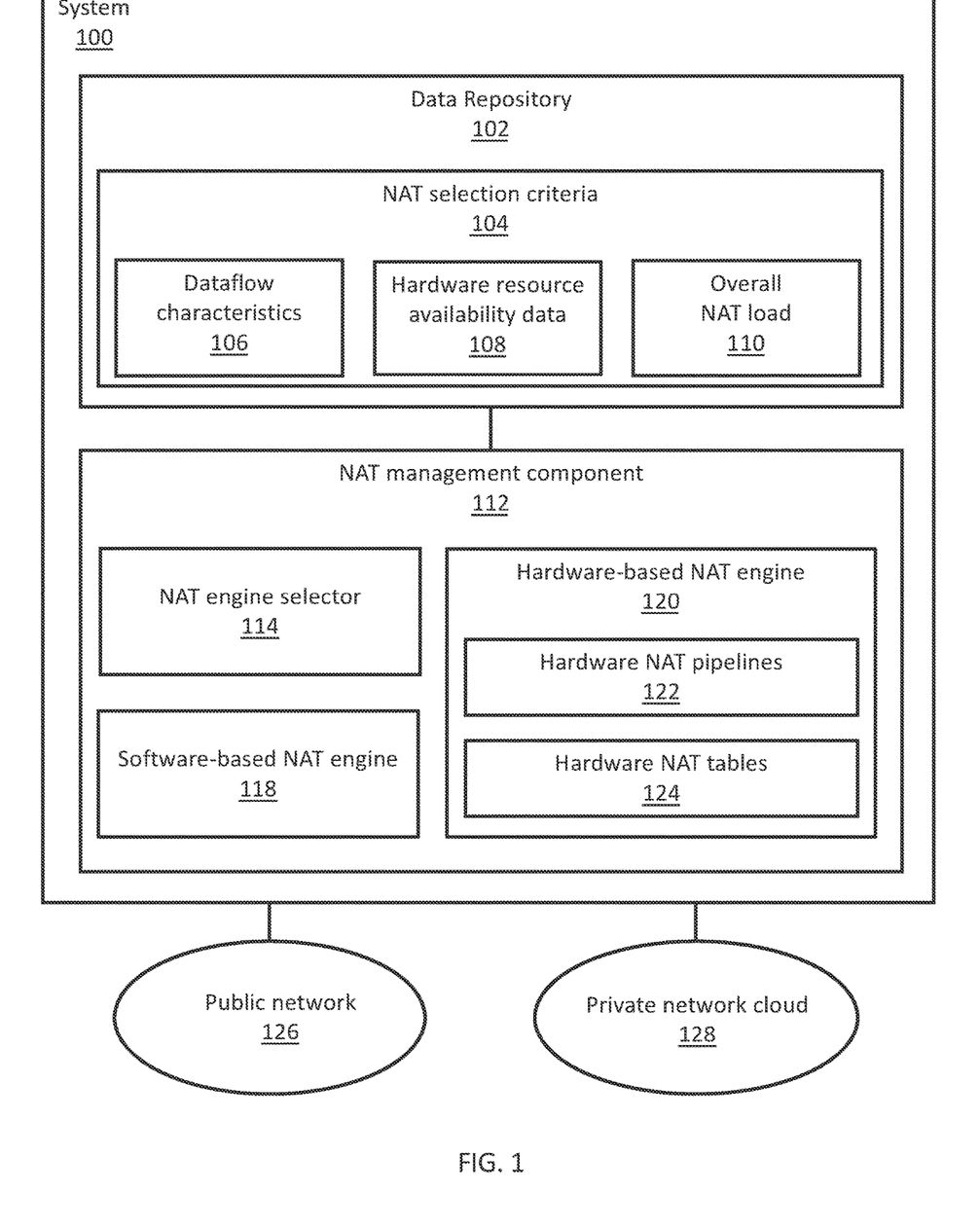
FIG. 1 illustrates an example of a NAT engine selection architecture, in accordance with one or more embodiments.

FIG. 1 illustrates a NAT engine selection architecture implemented by the system 100 in accordance with one or more embodiments. Some embodiments and examples herein describe the components and operations of the NAT engine selection architecture in relation to an Internet Protocol (IP) address as a specific example of a network address. These embodiments and examples may be equally applicable to any other type of network address. Some embodiments and examples, as described herein, with respect to NAT may be equally applicable to other translation processes such as, for example, Network Address and Port Translation (NAPT).

The system 100 may include more or fewer components than the components illustrated in FIG. 1. Components of example system 100 may be distributed over multiple applications and/or machines. Multiple components may be combined into one application and/or machine. Operations described with respect to one component may instead be performed by another component. Accordingly, component architecture and functionality, as described herein, should not be construed as limiting the scope of any of the claims.

In one or more embodiments, the system 100 corresponds to a router, firewall, and/or any other network device that configures and executes NAT operations as described herein. The system 100 may be connected to any number of networks such as a public network 126 and/or private cloud network(s) 128. A network (e.g., public network 126 or private cloud network 128) refers to the infrastructure and connectivity that enable communication and data transfer between different components within a computing environment.

A private cloud network 128 (also referred to as a "private cloud") may be characterized as a cloud computing environment dedicated to a single organization. The cloud computing environment may include resources that provide computing services/products such as, for example, storage, processing power, databases, networking, software, and analytics. A private cloud network 128 may refer to a private cloud environment with a secure and isolated network infrastructure. Resources within the private network cloud 128 may be isolated from the public internet, providing an additional layer of security. An organization's cloud-based resources may be accessible through a private and secure private network cloud 128, enhancing security, control, and privacy. A private cloud network 128 may be hosted on the physical premises of an organization (referred to as an "on-premise" network). Additionally, or alternatively, the private cloud network 128 may be hosted by third-party cloud service providers.

Devices within the private cloud network 128 may be identified with a corresponding private network address such as a private IP address. Private IP addresses are not directly accessible from outside of a corresponding private cloud network 128. Private IP addresses are defined in Request For Comments (RFC) 1918, titled "Address Allocation for Private Internets" and published by the Internet Engineering Task Force (IETF). Private IP addresses include specific address ranges for different types of networks (for example, 192.168.0.0 to 192.168.255.255 are commonly used in home networks). The same private IP addresses can be reused in different private cloud networks globally. Many devices in various private cloud networks can use the same private IP addresses without conflict because these addresses are not directly accessible from outside their respective networks.

The system 100 (e.g., a router or firewall), that operates as a gateway device for the private cloud network 128, may be communicatively coupled with (a) a network device(s) in a public network 126 or (b) another, different gateway device in another private cloud network. A public network 126, also referred to herein as the Internet, is a global network of interconnected computers and computer networks. The public network 126 may link millions of private, public, academic, business, and/or government networks worldwide. The public network 126 may be referred to as a network of networks. Devices on the public network 126 are identified with a corresponding public IP address. A public IP address is a globally unique identifier on the public network 126. Public IP addresses are accessible over the internet, and any source device may address a packet to a public IP address. Packets addressed to a public IP address are forwarded by Internet routers on the Internet to a next hop toward the public IP address. In contrast, packets addressed to any of the defined private IP addresses are dropped by Internet routers, thereby preventing the routing of these packets on the Internet.

Returning to the system 100, the system 100 may be configured for performing Network Address Translation (NAT) operations on packets in transit between a pair of devices in different networks. In an example, the system 100 translates between public IP addresses used on the public network 126 and private IP addresses used on the private network cloud(s) 128. As described above, the system 100 may correspond to a router or firewall that serves as a gateway device to a private network cloud 128. The gateway device may receive packets from a source device outside of the private network cloud 128 for forwarding to a device(s) within the private network cloud 128. These packets received from a source device outside of the private network cloud 128 for internal forwarding are referred to herein as ingress packets as the packets are entering the private network cloud 128. The gateway device may receive packets from a device inside of the private network cloud 128 for forwarding to a device(s) outside of the private network cloud 128. These packets received from a device inside of the private network cloud 128 for external forwarding are referred to herein as egress packets as the packets are exiting the private network cloud 128.

The system 100 may execute NAT operations on packets as they are entering or exiting a private network cloud 128. The system 100 may execute NAT operations by converting a public IP address, included as a destination address in a packet header of an ingress packet, to a private IP address corresponding to a device in the private cloud network 128. The system 100 may execute NAT operations by converting a private IP address, included as a source address in a packet header of an egress packet, to a public IP address corresponding to the system itself.

In an embodiment, the system 100 may include a data repository 102. The data repository 102 may include any type of a single-tier data storage system and/or a multi-tier data storage system (e.g., with primary and secondary storage tiers). The data repository 102 may represent a single, centralized storage component implemented on a single device or a set of distributed storage components implemented across multiple devices. The data repository 102 may be implemented on the system 100 itself, for example, in the memory of a router or firewall. The data repository 102 may be implemented on a separate device that is accessible by the system 100. The data repository 102 may serve as a secure and reliable repository to store various types of data for read and/or write access. The data repository 102 may be configured for data storage, data management/organization, data sharing, data preservation, archiving, data discovery and/or access. The data repository 102 may, for example, store NAT selection criteria 104.

The NAT selection criteria 104 may include factors or rules used to determine whether to use a hardware-based NAT engine 120 or a software-based NAT engine 118 for executing NAT operations for a dataflow. As described above, a dataflow refers to an exchange of data between a pair of devices. A subset of the data corresponding to a unit of transmission is referred to as a packet. A packet includes information that is transmitted together as a single addressable unit. A packet may include a header and a payload. The header may include control information characterized by a 5-tuple including source IP address, source port, destination IP address, destination port, and transport protocol.

The packets for a dataflow are exchanged during a communication session corresponding to the dataflow. A communication session may be characterized by an ongoing exchange of data between a pair of devices. During the communication session, devices may exchange information, often for a specific purpose such as web browsing, file transfer, email communication, or real-time video conferencing. A communication session may refer to, for example, a Transmission Control Protocol (TCP) session based on a TCP protocol or a User Datagram Protocol (UDP) session based on a UDP protocol. As known to a person of ordinary skill in the art, TCP protocol and UDP protocol are examples of communication protocols that define a set of rules for communication between devices on a same network or different networks. One or more embodiments dynamically switch between the use of software-based NAT operations and hardware-based NAT operations for a dataflow without terminating, pausing, or restarting the communication session corresponding to the dataflow. In other words, the system may dynamically switch between software-based NAT operations and hardware-based NAT operations mid-session, i.e., during the communication session. Furthermore, the system may dynamically switch between software-based NAT operations and hardware-based NAT operations without any change to a communications protocol being used for the communication session.

The NAT selection criteria 104 may define a set of rules for selection of a NAT engine based on factors that may include but are not limited to dataflow characteristics 106, hardware resource availability data 108 and/or overall NAT load 110. Examples of dataflow characteristics 106 may include, but are not limited to, a detected number of packets transmitted in a prior time period, a number of packets predicted for transmission during a future time period, a ranking associated with the dataflow, a hardware resource availability for implementing hardware-based NAT operations, a recency of packet transmissions associated with the dataflow, a priority level associated with the dataflow, a source device associated with the dataflow, a destination device associated with the dataflow, a user associated with the dataflow, a data type associated with the dataflow, a latency requirement associated with the dataflow, a Quality of Service (QOS) requirement associated with the dataflow, a traffic classification of the data associated with the dataflow, a data loss sensitivity associated with the dataflow, an application context associated with the dataflow, a compliance requirement associated with the dataflow, a traffic shaping technique associated with the dataflow, a security protocol associated with the dataflow, or an overall NAT load across active dataflows.

As noted above, the dataflow characteristics 106 may include a number of packets corresponding to a dataflow that were transmitted during a prior period of time. The NAT selection criteria 104 may, for example, trigger the use of the hardware-based NAT engine 120 in response to determining that the number of packets, transmitted during the prior period of time, exceeds a threshold value. Alternatively, or additionally, the NAT selection criteria 104 may trigger the use of software-based NAT engine 118 in response to determining that the number of packets transmitted during the prior period of time does not exceed the particular threshold value.

As noted above, the dataflow characteristics 106 may include a number of packets predicted for transmission during a future time period. The predicted number of packets may be determined by analyzing a data traffic pattern associated with the dataflow. The pattern may identify a periodic, temporary increase in data traffic, for example, for five minutes at the start of every thirty-minute time period. This pattern may be used to configure hardware-based NAT operations for the five minutes at the start of every thirty-minute time period and software-based NAT operations for the remaining twenty-five minutes in each thirty-minute time period.

In an embodiment, the hardware resource availability data 108 may identify the availability of hardware resources that can be used for implementing the hardware-based NAT engine(s) 120. The hardware resource availability data 108 may, for example, indicate a number of dataflows that can be processed using hardware-based NAT operations. The hardware resource availability data 108 may indicate a number of NAT entries that can be stored by the system 100. The hardware resource availability data 108 may identify unused hardware resources that are available for implementing hardware-based NAT operations.

In an embodiment, the overall NAT load 110 may indicate (a) a number of currently active dataflows and/or (b) a subset of active dataflows that meet one or more candidacy criteria for being processed via a hardware-based NAT engine. In an example, the candidacy criteria may identify a dataflow as a candidate for processing via the hardware-based NAT engine if a minimum number of packets p have been transmitted for the dataflow in the last ten minutes. The overall NAT load 110 may indicate a number of NAT entries that need to be maintained for supporting active dataflows.

When the overall NAT load 110 cannot be supported by available hardware-based NAT engine(s) 120, the system may use rankings associated with active dataflows to select a subset of the active dataflows for processing using a hardware-based NAT engine 120. The subset of the active dataflows (or dataflows that meet candidacy criteria) may be selected based on the associated rankings. The rankings may be based on, for example, a weighted combination of scores corresponding to each of a set of dataflow characteristics. The highest ranked dataflows may be selected for processing via the available hardware-based NAT engine(s).

When the entire NAT load 110 can be supported by available hardware-based NAT engine(s) 120, the system may, in some embodiments, process all of the active dataflows (or dataflows that meet candidacy criteria) for processing using a hardware-based NAT engine 120. This scenario may occur, for example, in the middle of the night or on the weekends when the number of active dataflows is greatly reduced in comparison to weekday mornings/afternoons.

The NAT selection criteria 104 may be used to select a hardware-based NAT engine 120 for executing NAT operations for incoming data and/or outgoing data. Incoming data, also referred to herein as ingress data, includes ingress packets that are (a) destined for a device on the private network cloud 128 associated with the system 100 and (b) sourced from a device outside of the private network cloud 128 associated with the system 100. Outgoing data, also referred to herein as egress data, includes egress packets that are being transmitted (a) from a device on the private network cloud 128 associated with the system 100 to (b) a device outside of the private network cloud 128 associated with the system 100.

Different NAT selection criteria 104 may be used for determining (a) whether to implement a hardware-based NAT engine for ingress packets of a particular dataflow and (b) whether to implement a hardware-based NAT engine for egress packets of that particular dataflow. One or more embodiments implement different types of NAT engines for the ingress packets and the egress packets of the same dataflow, based on the respective evaluation of ingress packets and the egress packets. A symmetric configuration refers to a configuration where the same type of NAT engine is used for NAT operations for both the incoming and outgoing packets of a dataflow. In one symmetric configuration, a hardware-based NAT engine is used for both ingress and egress packets of a dataflow. In another symmetric configuration, a software-based NAT engine is used for both ingress and egress packets of a dataflow. An asymmetric configuration refers to a configuration where one type of a NAT engine is used for NAT operations for ingress packets of a particular dataflow and another, different type of a NAT engine is used for NAT operations for egress packets of the particular dataflow. For example, in an asymmetric configuration, a hardware-based NAT engine is used for NAT operations for egress packets and a software-based NAT engine is used for NAT operations for ingress packets.

In an embodiment, the system 100 implements a NAT management component 112. The NAT management component 112 configures and executes NAT operations. The NAT management component implements NAT engines (e.g., a software-based NAT engine(s) 118 and/or a hardware-based NAT engine(s) 120) for processing various dataflows. The NAT management component 112 may implement the software-based NAT engine 118 or the hardware-based NAT engine 120 for a dataflow based on NAT engine selection by the NAT engine selector 114.

A software-based NAT engine 118 and a hardware-based NAT engine 120 are different types of NAT engines for performing NAT operations. A NAT engine, as referred to herein, may be characterized as one of the core components of a network device responsible for performing the NAT operations described herein. A NAT engine may execute NAT operations to convert a public IP address, included as a destination address in a packet header of an ingress packet, to a private IP address corresponding to a device in the private cloud network 128. This conversion enables the forwarding of the packet to a device within the private cloud network 128 to the device corresponding to the private IP address. Furthermore, a NAT engine may execute operations to convert a private IP address, included as a source address in a packet header of an egress packet, to a public IP address corresponding to a gateway (such as system 100) of a private cloud network 128. This conversion enables a recipient of the egress packet to send a response packet back to the gateway of the private cloud network 128. The response packet, received by the gateway in response to transmitting the egress packet, is then addressed to the public IP address corresponding to the gateway.

In addition to the network addresses (e.g., IP addresses), the NAT engine may similarly convert source and destination ports included in a packet header. Methods described herein with relation to NAT operations may be performed for Network Address Port Translation (NAPT) operations. NAPT operations involve translating both network addresses and port numbers in a packet header.

In an embodiment, a hardware-based NAT engine 120, as referred to herein, may be characterized by components within a networking device that are designed to perform hardware-based NAT operations. The hardware-based NAT engine includes specialized hardware components such as Application Specific Integrated Circuits (ASICs) or Network Processing Units (NPUs).

A hardware-based NAT engine 120 may be configured to implement a hardware NAT pipeline 122 for performing the hardware-based NAT operations. A hardware NAT pipeline 122, as referred to herein, may be characterized by a dedicated processing path within a networking device that is configured for NAT operations. The hardware NAT pipeline 122 uses the specialized hardware components of the hardware-based NAT engine 120 to perform hardware-based NAT operations. A hardware NAT pipeline 122 may be characterized by a set of stages that may include, but are not limited to, packet inspection, translation, and routing.

In one or more embodiments, the hardware-based NAT engine 120 may be configured to implement a hardware NAT table 124. A hardware NAT table 124 keeps track of at least a subset of active NAT translations in the NAT entries of the hardware NAT table 124. When a packet header includes information corresponding to a NAT entry in the hardware NAT table 124, the NAT entry can be used to execute a NAT operation that modifies the packet header.

A hardware NAT table 124 enables execution of the hardware NAT pipeline 122 to perform hardware-based NAT operations for at least a subset of active dataflows. The hardware NAT table 124 includes NAT entries with network address and port mappings. In an example, a NAT entry may map private IP addresses corresponding to a private network to public IP addresses corresponding to the public network. The NAT management component 112 implements a hardware NAT pipeline 122 for a dataflow by adding a NAT entry in a hardware NAT table 124 corresponding to the dataflow. The NAT management component 112 terminates or tears down a hardware NAT pipeline 122 for the dataflow by removing any NAT entries for the dataflow from the hardware NAT table 124 corresponding to the dataflow.

In an embodiment, a software-based NAT engine 118, as referred to herein, may be characterized by components within a networking device that are designed to perform software-based NAT operations. The software-based NAT engine uses a networking device's CPU to execute a sequence of software routines and/or algorithms to execute software-based NAT operations based on software NAT tables (not illustrated). Software NAT tables may be stored, for example, in the data repository 102. Software NAT tables may store information for mapping between network addresses and ports corresponding to devices within a particular private network and devices outside of that particular private network. Information from the software NAT tables may be loaded into registers for execution of NAT operations by the networking device's CPU. The software-based NAT engine may manage NAT mappings, inspect incoming packets, and/or modify packet headers in accordance with NAT operations. A software-based NAT engine may be integrated into the networking software stack of an operating system. Unlike hardware-based NAT engine 120, a software-based NAT engine 118 does not include any dedicated hardware for performing NAT operations. When any hardware NAT pipeline 122 is not configured for executing NAT operations for a particular dataflow, the NAT operations are executed by the software-based NAT engine 118 based on NAT mappings managed by the software-based NAT engine. Accordingly, a tear-down of a hardware NAT pipeline 122 for the processing of a dataflow may result in the use of a software-based NAT engine 118.

In an embodiment, the NAT engine selector 114 includes one or more hardware and/or software components with functionality to select a NAT engine (e.g., software-based NAT engine 118 or a hardware-based NAT engine 120) for executing NAT operations for a dataflow. The NAT engine selector 114 may be characterized by a process that is executed periodically or in response to triggering events to select a NAT engine based on the NAT selection criteria 104. Alternatively, or additionally, the NAT engine selector 114 may be characterized by a continually executing process that evaluates NAT selection criteria 104 on a periodic basis or in response to a triggering event to select the NAT engine for future NAT operations for a dataflow. The NAT engine, selected by the NAT engine selector 114, for executing future NAT operations for a dataflow may be different from or the same as the NAT engine currently being used for executing NAT operations. The NAT engine selector 114 may select a NAT engine based on the NAT selection criteria 104 described above. When selecting a NAT engine, the NAT engine selector 114 may also consider a cost (for example, time or performance impact) associated with switching NAT engines. For example, the NAT engine selector 114 may consider the time or performance impact that may result from switching a currently implemented software-based NAT engine to a hardware-based NAT engine for an active dataflow. Furthermore, the NAT engine selector 114 may consider the time or performance impact that may result from switching a currently implemented hardware-based NAT engine to a software-based NAT engine for an active dataflow.

Figure 2:
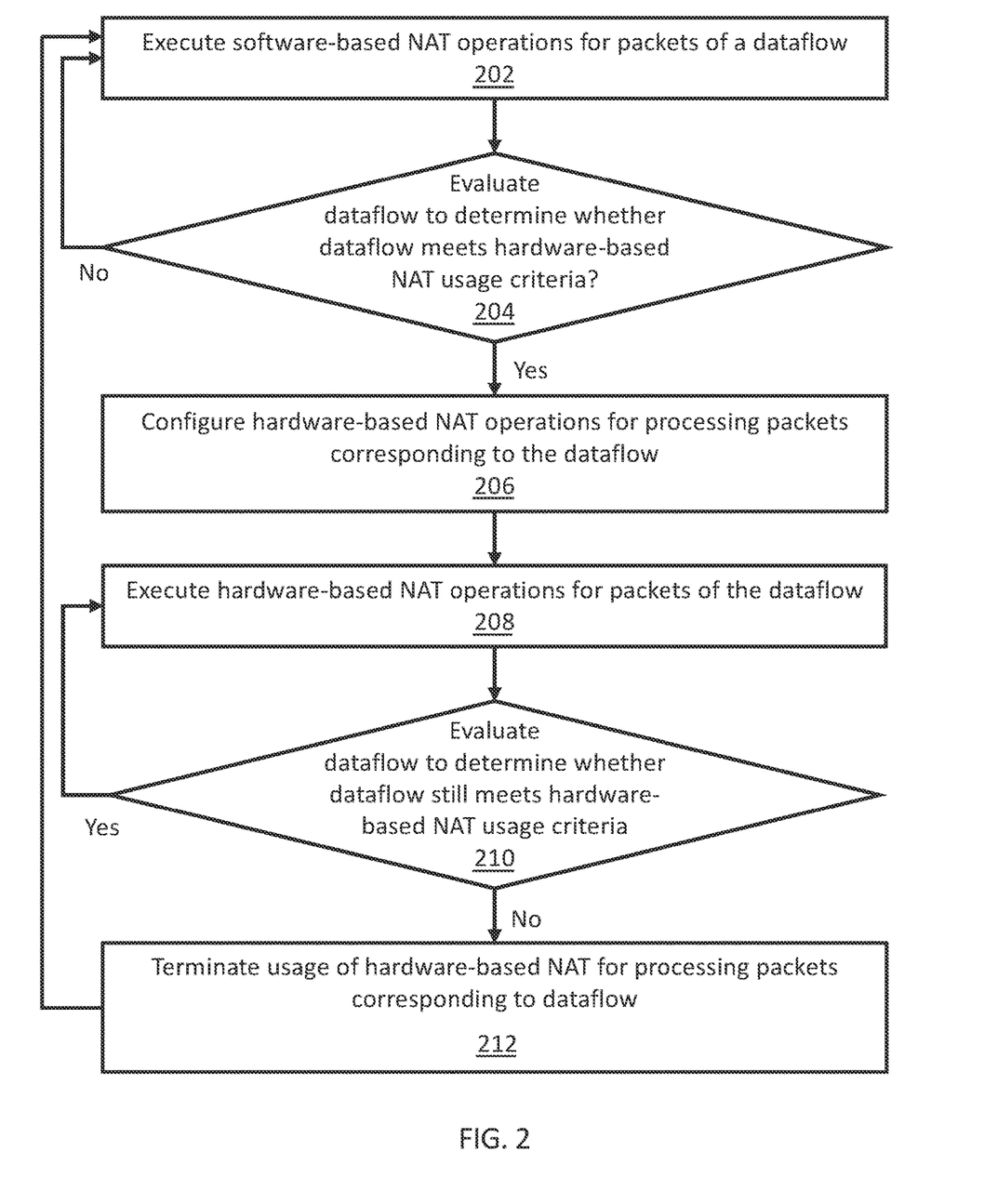
FIG. 2 illustrates steps of dynamically switching between software and hardware NAT engines for executing NAT operations for a dataflow, in accordance with one or more embodiments.

3. Dynamically Switching Between Software and Hardware NAT Engines for Execution of NAT Operations for a Dataflow FIG. 2 illustrates steps executed by a system for dynamically switching between software and hardware NAT engines for executing NAT operations for a dataflow, in accordance with one or more embodiments. Executing NAT operations for a dataflow may be referred to herein as processing a dataflow using NAT operations or processing packets for the dataflow. Executing NAT operations may result in modifying packet headers of the packets corresponding to the dataflow, as described below. The system executing the NAT operations, as referred to below, may correspond to a firewall, router, or other network device that may configure and implement NAT for a dataflow. The system, referred to below, may correspond to system 100 described above with reference to FIG. 1.

One or more steps illustrated in FIG. 2 may be modified, rearranged, or omitted all together. Accordingly, the particular sequence of steps illustrated in FIG. 2 should not be construed as limiting the scope of one or more embodiments.

In an embodiment, packets for a dataflow are being processed using software-based NAT operations (Step 202). Step 202 may correspond to an initial processing of a new dataflow where the system is configured to initially process packets for each new dataflow using software-based NAT operations. Alternatively, the system may be configured to initially process packets for each new dataflow using hardware-based NAT operations if a hardware NAT pipeline is available. In this alternate scenario, the first step in the sequence of steps may be Step 208 instead of Step 202. In another alternative embodiment, the system may be configured to evaluate each new dataflow with respect to any known NAT selection criteria to select either the software-based NAT operations (as in Step 202) or the hardware-based NAT operations (as in Step 208) for the initial processing of packets for the dataflow. Some dataflow characteristics, such as a number of packets transmitted for the dataflow during one or more time intervals, may not yet be known for the new dataflow. As a result, the selection of software-based NAT operations or hardware-based NAT operations for a new dataflow may be based on a partial set of the NAT selection criteria.

In an embodiment, a system executes software-based NAT operations in Step 202 using the system's one or more CPUs. A CPU executes a software NAT operation based on software-based processes and algorithms. A network stack of an operating system, executing on the system, receives packets from a network interface of the system. The CPU parses the received packets to extract essential information from packet headers including, for example, source IP address, destination IP address, source port, destination port, and/or the protocol type (TCP, UDP, etc.). The received packets may include ingress packets that are received from a public network. The received packets may include egress packets that are received from a device within a private network associated with the system. The CPU modifies packet headers, of the received packets, based on NAT entries in a translation table that indicate a mapping or translation between public network addresses and private network addresses. In an example, for an egress packet, the CPU replaces a source address in the packet header. A private IP address in the packet header, that is identified as a source address, is replaced with the public IP address assigned to the system (e.g., the router or firewall's public IP address). Furthermore, the CPU may replace the source port number in the packet header of an egress packet with a unique port number chosen by the system. This port number helps the system keep track of multiple connections from different internal devices. The system then transmits the egress packet, with the modified packet header, on the Internet toward the destination IP address indicated in the egress packet. For an ingress packet, the CPU replaces the destination address in the packet header. The destination address in the packet header corresponds to a public IP address of the system (e.g., router or switch) that receives the packet from the Internet. The public IP address, identified as the destination address with the packet header, is replaced with the private IP address of a device within the private network. Furthermore, the system may replace the destination port number in the packet header with the original port number that was used by that device, within the private network, as a source port number for a previously sent egress packet. The system then transmits the ingress packet, with the modified header, on the private network toward the device within the private network.

In an embodiment, the system evaluates a dataflow, currently being processed using software-based NAT operations, to determine whether the dataflow meets hardware-based NAT usage criteria (Step 204). Step 204 may be concurrently executed with Step 202. In other words, the system may continue to process packets for the dataflow using software-based NAT operations as described in Step 202 while the evaluating step 204 is executed. The system may execute Step 204 periodically while executing Step 202. In an example, the system may execute Step 204 every n minutes in relation to a particular dataflow while step 202 is continually executed to perform NAT operations on packets corresponding to the particular dataflow as the packets are received by the system.

Alternatively, or in addition, the system may execute Step 204 in response to a triggering event. The triggering event may include a detected change in a number of packet transmissions meeting a triggering condition. In an example, the system monitors a number of transmitted packets corresponding to the dataflow in each of a set of time intervals. If a difference between (a) a number of packets transmitted in a most-recent time interval and (b) a number of packets transmitted in a preceding time interval exceeds a threshold value, the system triggers execution of Step 204.

The triggering event for executing Step 204 may include a detected change in the availability of hardware resources meeting a triggering condition. In an example, a NAT entry in a hardware NAT table may timeout, causing a removal of the NAT entry from the hardware NAT table. The timeout may be the result of the termination of a dataflow or a lack of recent packet transmissions corresponding to the dataflow. The removal of the NAT entry from the hardware NAT table deallocates or otherwise frees up hardware resources that were previously dedicated for storing the now-removed NAT entry in the hardware NAT table. In order to efficiently utilize available hardware resources, the system triggers the evaluation Step 204 in response to the detected availability of hardware resources. Step 204 may potentially identify another dataflow d for processing using hardware-based NAT operations. Processing the dataflow d using hardware-based NAT operations may result in reallocating the hardware resources for storage of NAT entries corresponding to the dataflow d.

In an embodiment, evaluating the dataflow in Step 204 may include evaluating the dataflow in view of the NAT selection criteria. As described above, the NAT selection criteria may include, for example, dataflow characteristics, hardware resource availability data, and/or an overall NAT load. In an example, evaluating the dataflow includes determining whether a number of transmitted packets in a particular time period or an average number of transmitted packets across a set of time periods meets a threshold value. If the threshold value is met, then the system determines that the hardware-based NAT usage criteria has been met.

If the system determines that the dataflow does not meet the hardware-based NAT usage criteria, then the system continues to process the dataflow using software-based NAT operations. If the system determines that the dataflow does meet the hardware-based NAT usage criteria, then the system configures hardware-based NAT operations for processing the dataflow (Step 206). Configuring hardware-based NAT operations for processing the dataflow may include adding NAT entries, corresponding to the dataflow, to a hardware NAT table.

In an embodiment, Steps 204 and 206 include ranking active dataflows and configuring the n highest ranked dataflows for hardware-based NAT operations. The system may select n dataflows for processing with hardware-based NAT operations based on a determination that the hardware resources are able to support hardware-based NAT operations for n dataflows. Alternatively, the system may select n dataflows for processing with hardware-based NAT operations based on user input, a static system configuration, or a dynamic system configuration indicating that n dataflows are to be processed using hardware-based NAT operations.

In an example, the system ranks each of a set of active dataflows based on the NAT selection criteria described above. The set of active dataflows being ranked may include dataflows currently processed using hardware-based NAT operations and dataflows currently being processed using software-based NAT operations. Based on the rankings, the system identifies the n highest ranked dataflows that are now to be supported by hardware-based NAT operations. If a dataflow D1, that is currently supported by hardware-based NAT operations, is not included in the n highest ranked dataflows, the processing of that dataflow D1 is switched from hardware-based NAT operations to software-based NAT operations. Switching the processing of the dataflow IDI from hardware-based NAT operations to software-based NAT operations includes removing any NAT entries from a hardware NAT table that corresponds to the dataflow D1. If a dataflow D2, that is currently supported by hardware-based NAT operations, is included in the n highest ranked dataflows, there is no change to the processing of dataflow D2. The system continues to process dataflow D2 using hardware-based NAT operations. If a dataflow D3, that is not currently supported by hardware-based NAT operations, is included in the n highest ranked dataflows, the processing of that dataflow D3 is switched from software-based NAT operations to hardware-based NAT operations. Switching the processing of the dataflow D3 from software-based NAT operations to hardware-based NAT operations includes adding NAT entries corresponding to the dataflow D3 to a hardware NAT table to enable hardware-based NAT operations for dataflow D3. If a dataflow D4, that is not currently supported by hardware-based NAT operations, is not included in the n highest ranked dataflows, there is no change to the processing of dataflow D4. Dataflow D4 continues to be processed using software-based NAT operations.

One or more embodiments implement per-pipeline programming for a system that implements multiple hardware NAT pipelines. In an example scenario for implementing per-pipeline programming, the system configures hardware-based NAT operations for a subset of hardware NAT pipelines rather than all hardware NAT pipelines. Specifically, the system (a) adds NAT entries for a dataflow to a hardware NAT table corresponding to a particular hardware NAT pipeline being used for process packets associated with the dataflow and (b) refrains from adding NAT entries for the dataflow to other hardware NAT tables corresponding to other hardware NAT pipelines that are not being used to process packets associated with the dataflow.

In another example, a system may initially implement multiple hardware NAT pipelines for the ingress packets of a particular dataflow, when the actual hardware NAT pipeline that is to be used for the ingress packets is unknown. Later, when the actual hardware NAT pipeline being used for the ingress packets has been identified, the NAT entries for processing the ingress packets are removed from the NAT tables for the hardware NAT pipelines that are not being used for processing the ingress packets.

Once a dataflow has been configured for processing using hardware-based NAT operations by the addition of NAT entries to a hardware NAT table, a hardware NAT pipeline may execute hardware-based NAT operations to process the packets for the dataflow (Step 208). A packet received by a network interface of a system (e.g., a router or a firewall) is processed by the hardware NAT pipeline of the system using NAT entries in the hardware NAT table. A NAT entry in the hardware NAT table may be used to perform a hardware-based NAT operation that translates a public IP address, identified as a destination address in a packet header, to a private IP address. The private IP address being assigned to a device in a private network. A NAT entry in the hardware NAT table may be used to perform a hardware-based NAT operation that translates a private IP address, identified as a source address in a packet header, to a public IP address. The public IP address being assigned to a gateway device that transmits the packet onto the Internet.

While the packets for the dataflow are being processed using hardware-based NAT operations in Step 208, the system evaluates the dataflow to determine whether the dataflow still meets hardware-based NAT usage criteria (Step 210). If the system determines that the dataflow still meets the hardware-based NAT usage criteria, the system continues to use hardware-based NAT operations. If the system determines that the dataflow does not meet the hardware-based NAT usage criteria, the system terminates usage of hardware-based NAT operations for processing the dataflow (Step 212). Terminating the usage of hardware-based NAT operations for a dataflow may include removing any NAT entries corresponding to the dataflow from a hardware NAT table. The removal of the NAT entries may result in a "miss" by a hardware NAT pipeline for translating packets corresponding to the dataflow. The miss by the hardware NAT pipeline may trigger software-based NAT operations that modify the packet headers of the packets for performing NAT.

The hardware-based NAT usage criteria referenced in Step 210 may be the same as or different than the hardware-based NAT usage criteria referenced in Step 204. In one example, a threshold number of packet transmissions during an interval that triggers the configuration of hardware-based NAT operations for a dataflow is higher than the threshold number of packet transmissions during an interval to retain the configuration of hardware-based NAT operations for the dataflow. Similar to Step 204, Step 210 may be executed periodically, or in response to one or more triggering events, as described above. The same or different triggering events may be configured for execution of evaluation operations 204 and 210.

As can be understood by a person of skill in the art, the configuration of hardware-based NAT operations as described in Step 206 and the termination of the use of the hardware-based NAT operations as described in Step 212 take time and temporarily impact performance. An unlimited flipping between the use of software-based NAT operations and hardware-based NAT operations is not desirable due to the time taken to perform the switch and/or temporary performance impact. In one embodiment, the system executes evaluation Step 210 only after the passage of a minimum period of time since the configuration of hardware-based NAT operations for processing packets corresponding to the dataflow in Step 206. In other words, after the configuration of the hardware-based NAT operations for processing packets corresponding to the dataflow, the system uses the hardware-based NAT operations for at least the minimum period of time to process the dataflow before determining whether to switch back to software-based NAT operations. This minimum period of time ensures that the system does not flip back and forth between software-based NAT operations and hardware-based NAT operations at an undesired frequency, or result in an undesired performance impact. A similar minimum period of time may be applied for evaluation step 204 when the system switches from processing a dataflow from using hardware-based NAT operations to using software-based NAT operations. Dynamically switching between software-based NAT operations and hardware-based NAT operations for active dataflows, without unlimited flipping back and forth, provides for the efficient use of NAT engine selection architecture. The efficient use of NAT engine selection architecture may result in processing dataflows using hardware-based NAT operations during heavy traffic periods and processing dataflows using software-based NAT operations during slow traffic periods.

3. Per-Pipeline Programming for Hardware NAT Pipelines

One or more embodiments implement per-pipeline programming for hardware NAT tables based on the dataflows being processed by the respective NAT hardware pipelines. Packets for a dataflow may be transmitted and/or received via a particular physical port of a system (e.g., router or firewall). Packets for a dataflow that are transmitted and/or received via a particular port may be processed using a hardware NAT pipeline, associated with that particular port, using a corresponding hardware NAT table. A per-pipeline programmed hardware NAT table (a) includes NAT entries associated with dataflows processed by a corresponding hardware NAT pipeline and (b) does not include NAT entries associated with dataflows that are not processed by the corresponding hardware NAT pipeline.

Figure 3:
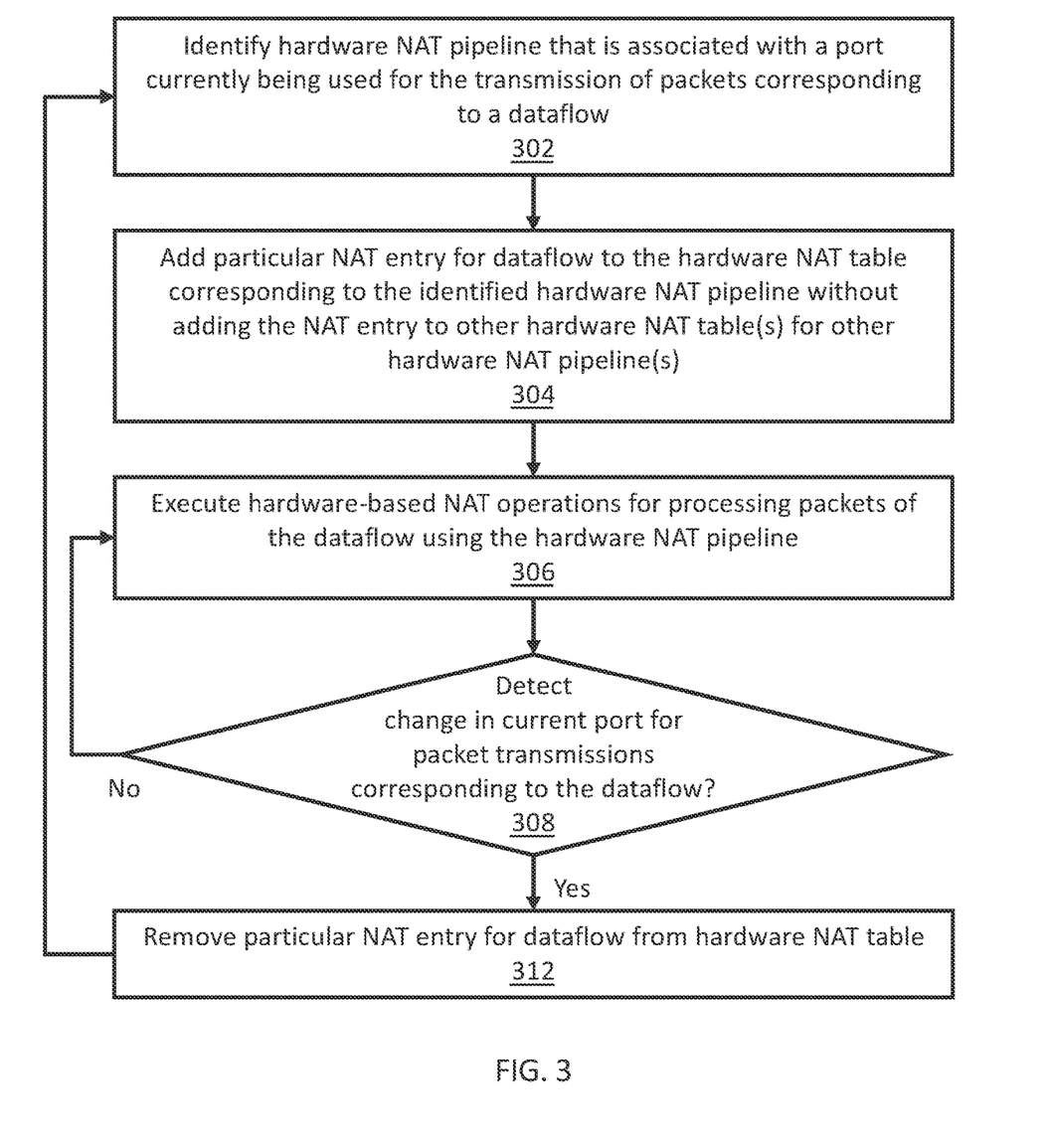
FIG. 3 illustrates steps for transferring the NAT entries from one hardware NAT table to another hardware NAT table in response to a transfer of a dataflow from one port to another port, in accordance with one or more embodiments.

FIG. 3 illustrates steps executed by a system for transferring the NAT entries from one hardware NAT table to another hardware NAT table in response to a transfer of the dataflow from one port to another port, in accordance with one or more embodiments. The steps described below may be implemented for transferring NAT entries for both egress and ingress packets of the dataflow, or NAT entries for one of egress packets or ingress packets. Different ports and different corresponding NAT hardware pipelines may be used for egress packets and ingress packets of the same dataflow. The system, executing steps as described below with reference to FIG. 3, may correspond to a firewall, router, or other network device that may configure and implement NAT for a dataflow. One or more steps illustrated in FIG. 3 may be modified, rearranged, or omitted all together. Accordingly, the particular sequence of steps illustrated in FIG. 3 should not be construed as limiting the scope of one or more embodiments.

In an embodiment, the system identifies a dataflow that meets hardware-based NAT usage criteria. Steps for identifying a dataflow that meets hardware-based NAT usage criteria are described above in relation to FIG. 2.

The system further identifies the hardware NAT pipeline that is associated with a port currently being used for transmission of packets corresponding to the dataflow, in accordance with one or more embodiments (Step 302). The system may identify the port by monitoring the packets associated with the dataflow. In an example, the system may identify the port currently being used for transmission of packets corresponding to the dataflow based on a packet header associated with a packet corresponding to the dataflow. Alternatively, or additionally, the system may identify the port by evaluating configuration metadata associated with the dataflow, that explicitly identifies the port.

In an embodiment, the system configures hardware-based NAT operations for processing packets corresponding to the dataflow. When implementing per-pipeline programming, the system configures the hardware-based NAT operations by adding a particular NAT entry for the dataflow to the hardware NAT table corresponding to the hardware NAT pipeline identified in Step 302, without adding the NAT entry to other hardware NAT table(s) for other hardware NAT pipeline(s) that may be implemented by the system (Step 304). Configuring hardware-based NAT operations for processing packets corresponding to the dataflow is further described above in relation Step 206. Once the NAT entry for the dataflow has been added to the hardware NAT table corresponding to the identified hardware NAT pipeline, the system executes hardware-based NAT operations for processing packets of the dataflow using the hardware NAT pipeline (Step 306). Step 306 is similar to Step 208, as described above.

In an embodiment, the system monitors the current port(s) (e.g., ingress port and/or egress port) used for packet transmissions corresponding to the dataflow. Monitoring the current port(s) includes detecting whether there has been a change in the current port(s) for the packet transmissions corresponding to the dataflow (Step 308). The system may check for a change in current port(s) periodically or in response to a triggering event. For example, the system may check for a change in a current port in response to a change in a latency associated with a packet acknowledgement message. A change in latency may be indicative of a different network path being used for packet transmissions associated with the dataflow. The different network path may result in a different port being used for the data transmissions. If the system does not detect a change in the current port(s), the system continues to execute the hardware-based NAT operations for processing packets of the dataflow, as described in Step 306, using the hardware NAT pipeline identified in Step 302.

If the system detects a change in the current port(s), the system executes a transfer process to move the NAT entry corresponding to the dataflow. The transfer process includes removing the particular NAT entry (Step 312) that was previously added, in Step 304, to the hardware NAT table corresponding to the hardware NAT pipeline associated with the previously used port (previous "current port"). The transfer process further includes identifying the hardware NAT pipeline that is associated with the new, current port(s) being used for transmission of packets for the dataflow, and adding the NAT entry to the corresponding hardware NAT table (system re-executes steps 302 and 304 based on the new, current port).

Figure 4:
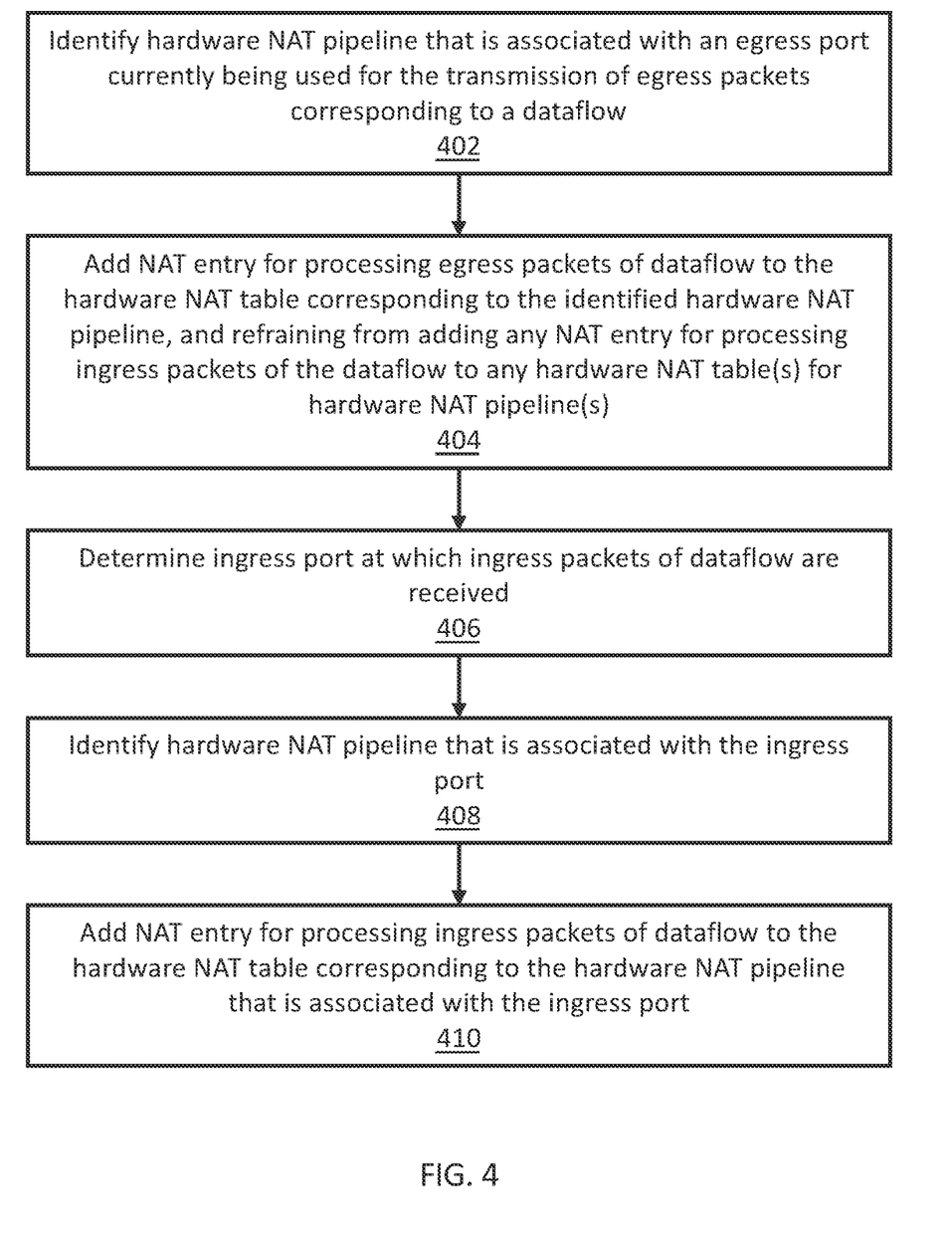
FIG. 4 illustrates steps for implementing asymmetric NAT configuration, in accordance with one or more embodiments.

FIG. 4 illustrates steps for implementing asymmetric NAT configuration, in accordance with one or more embodiments. As described above, asymmetric NAT configuration may involve processing egress packets for a dataflow using one of hardware-based NAT operations or software-based NAT operations, and processing ingress packets for the dataflow using the other of hardware-based NAT operations or software-based NAT operations. Steps described below, in relation to FIG. 3, include temporary implementation of asymmetric NAT configuration, followed by implementation of symmetric NAT configuration.

In other (non-illustrated) embodiments, asymmetric NAT configuration may be implemented permanently for a dataflow based on the respective evaluation of ingress packets and egress packets for a dataflow in view of NAT selection criteria. In an example of permanent asymmetric NAT configuration, hardware-based NAT operations are used for ingress packets in response to the number of ingress packets for each monitored time interval meeting a threshold value. Software-based NAT operations are used for egress packets in response to the number of egress packets for each monitored time interval not meeting a threshold value.

Returning to FIG. 4, the system, executing steps as described below, may correspond to a firewall, router, or other network device that may configure and implement NAT for a dataflow. One or more steps illustrated in FIG. 4 may be modified, rearranged, or omitted all together. Accordingly, the particular sequence of steps illustrated in FIG. 4 should not be construed as limiting the scope of one or more embodiments.

In one or more embodiments, the system identifies a port currently being used for the transmission of egress packets corresponding to a dataflow. Furthermore, the system identifies the hardware NAT pipeline that is associated with the port currently being used for transmission of the egress packets corresponding to the dataflow (Step 402). The system may identify the port by monitoring the egress packets associated with the dataflow. In an example, the system may identify the port currently being used for transmission of packets corresponding to the dataflow based on a packet header associated with a packet corresponding to the dataflow. Alternatively, or additionally, the system may identify the port by evaluating configuration metadata associated with the dataflow, that explicitly identifies the port.

In an embodiment, the system configures hardware-based NAT operations for processing the egress packets corresponding to the dataflow. The system configures the hardware-based NAT operations by adding a NAT entry for processing egress packets of the dataflow to the hardware NAT table (Step 404) corresponding to the hardware NAT pipeline identified in Step 402. The system refrains from adding any NAT entry for processing ingress packets of the dataflow to any hardware NAT table(s) for other hardware NAT pipeline(s). The addition of a NAT entry for the processing of egress packets without the addition of any NAT entry for the processing of ingress packets results in asymmetric NAT configuration. The egress packets are processed using hardware-based NAT operations. The ingress packets are initially processed using software-based NAT operations since hardware-based NAT operations have not yet been configured for the ingress packets.

As described above, when implementing per-pipeline programming, NAT entries for a dataflow are added to NAT hardware tables corresponding to the NAT hardware pipelines that are associated with the port(s) being used for the dataflow. The above described asymmetric configuration may be based on (a) the identification of the port being used for the egress packets and (b) the lack of the identification of the port to be used for ingress packets due to ingress packets not yet being received for the dataflow.

Once the ingress packets for the dataflow are received, the system determines the ingress port at which the ingress packets for the dataflow are received (Step 406). Similar to Step 402, the ingress port may be identified by inspecting the packet headers for the ingress packets, or evaluating configuration metadata associated with the dataflow, that explicitly identifies the ingress port. The configuration metadata may, in some cases, be generated based on received ingress packets.

In one or more embodiments, the system identifies the hardware NAT pipeline that is associated with the ingress port at which the ingress packets corresponding to the dataflow are received (Step 408). The system then configures hardware-based NAT operations for processing the ingress packets corresponding to the dataflow. The system configures the hardware-based NAT operations by adding a NAT entry for processing ingress packets of the dataflow to the hardware NAT table (Step 410) corresponding to the hardware NAT pipeline identified in Step 408. The egress packets and the ingress packets are now both processed using hardware-based NAT operations. Accordingly, the addition of a NAT entry for the processing of ingress packets results in updating the asymmetric NAT configuration to symmetric NAT configuration.

In an alternate embodiment (not illustrated) for per-pipeline programming, the system implements an initial symmetric NAT configuration, followed by implementation of a modified symmetric NAT configuration. In this alternate embodiment, the system adds a NAT entry for processing egress packets of a dataflow to the hardware NAT table, as described above in Step 404. However, instead of refraining from adding any NAT entry for processing of ingress packets, the system adds a NAT entry for processing of ingress packets to each hardware NAT table corresponding to a set of hardware NAT pipelines associated with candidate ports where the ingress packets may be received in the future. The addition of the NAT entry for processing of ingress packets to each of the hardware NAT tables allows for hardware-based NAT operations for the ingress packets, regardless of the port at which the ingress packets are received. When the ingress packets are later received on a particular port of the candidate ports, the particular hardware NAT pipeline associated with the particular port processes the ingress packets. Specifically, the particular hardware NAT pipeline executes hardware-based NAT operations using the NAT entry, for the ingress packets, from the hardware NAT table associated with the particular hardware NAT pipeline. The system removes the NAT entry, for the ingress packets, from the other NAT hardware tables that are not used for processing the ingress packets.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may include a router, firewall, or any other device that incorporates hard-wired and/or program logic to implement the techniques.

Figure 5:
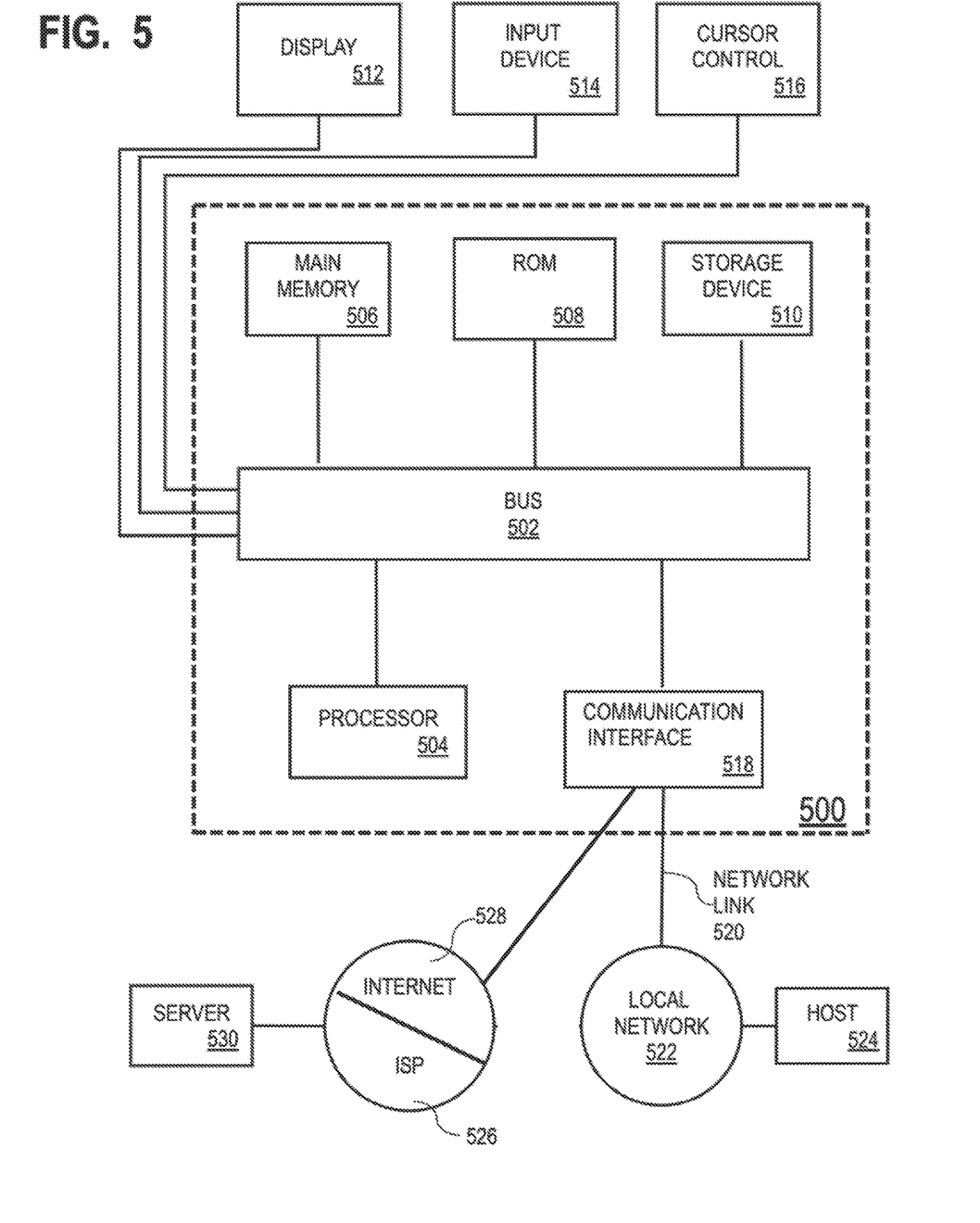
FIG. 5 illustrates a system in accordance with one or more embodiments.

For example, FIG. 5 is a block diagram that illustrates a computing system 500 upon which an embodiment of the disclosure may be implemented. Computing system 500 includes a bus 502 or other communication mechanism for communicating information, and a hardware processor 504 coupled with bus 502 for processing information. Hardware processor 504 may be, for example, a general purpose microprocessor.

Computing system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computing system 500 into a special-purpose machine that is customized to perform the operations specified in the instructions.

Computing system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computing system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computing system 500 may implement the techniques described herein using customized hard-wired logic, one or more ASICs or FPGAs, firmware and/or program logic which in combination with the computing system causes or programs computing system 500 to be a special-purpose machine. According to one embodiment, the techniques herein are performed by computing system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computing system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computing system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network links 520 typically provide data communication through one or more networks to other data devices. For example, network link 520 may provide a connection through local network 522 to a host computer 524. Another network 520 may provide a connection to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computing system 500, are example forms of transmission media.

Computing system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

6. Miscellaneous; Extensions

Unless otherwise defined, all terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected and every effort made to prevent their use in any manner which might adversely affect their validity as trademarks.

Embodiments are directed to a system with one or more devices that include a hardware processor and that are configured to perform any of the operations described herein and/or recited in any of the claims below.

In an embodiment, one or more non-transitory computer readable storage media comprises instructions which, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. One or more non-transitory computer readable media comprising instructions which, when executed by one or more hardware processors, cause performance of operations comprising:
   identifying a set of active dataflows between pairs of devices;
   ranking the set of active dataflows to identify a first dataflow as being associated with a first ranking and to identify a second dataflow as being associated with a second ranking lower than the first ranking;
   evaluating the first dataflow to determine whether the first dataflow meets a hardware-based Network Address Translation (NAT) usage criterion;
   responsive to determining that the first dataflow meets the hardware-based NAT usage criterion, executing a set of hardware-based NAT operations to process a first set of packets corresponding to the first dataflow; and
   based on the second dataflow being associated with the second ranking, executing a set of software-based NAT operations to process a second set of packets corresponding to the second dataflow.

2. The one or more non-transitory computer readable media of claim 1, wherein the operations further comprise:
   subsequent to executing the set of hardware-based NAT operations to process the first set of packets:
   determining whether a number of packets associated the first dataflow in a particular time period does not meet a threshold value; and
   responsive to the number of packets not meeting the threshold value, executing an additional set of software-based NAT operations to process a third set of packets corresponding to the first dataflow.

3. The one or more non-transitory computer readable media of claim 2, wherein the first set of packets and the third set of packets are exchanged between a same pair of devices during a same communication session.

4. The one or more non-transitory computer readable media of claim 1, wherein the hardware-based NAT usage criterion is based on dataflow characteristics.

5. The one or more non-transitory computer readable media of claim 1, wherein the hardware-based NAT usage criterion defines a minimum number of packets during a prior time interval and wherein the set of hardware-based NAT operations are executed for processing the first set of packets based on a number of packets for the first dataflow exceeding the minimum number of packets during the prior time interval.

6. The one or more non-transitory computer readable media of claim 1, wherein executing the set of hardware-based NAT operations to process the first set of packets comprises adding a NAT entry, corresponding to the first dataflow, to a hardware NAT table corresponding to a hardware NAT pipeline.

7. The one or more non-transitory computer readable media of claim 6, wherein the operations further comprise:
   subsequent to executing the set of hardware-based NAT operations to process the first set of packets:
   re-evaluating the first dataflow to determine whether the first dataflow meets a corresponding hardware-based NAT usage criterion selected from: the hardware-based NAT usage criterion or an additional hardware-based NAT usage criterion;
   responsive to determining that the first dataflow does not meet the corresponding hardware-based NAT usage criterion when re-evaluating the first dataflow, removing the NAT entry from the hardware NAT table.

8. The one or more non-transitory computer readable media of claim 1, wherein the hardware-based NAT usage criterion is based on at least one of hardware resource availability or overall NAT load.

9. One or more non-transitory computer readable media comprising instructions which, when executed by one or more hardware processors, cause performance of operations comprising:
- receiving a first set of packets corresponding to a first dataflow;
- evaluating the first dataflow to determine that the first dataflow meets a hardware-based Network Address Translation (NAT) usage criterion;
- responsive to determining that the first dataflow meets the hardware-based NAT usage criterion:
  - identifying a first hardware NAT pipeline to be used for processing the first set of packets corresponding to the first dataflow;
  - adding a first NAT entry, corresponding to the first dataflow, to a first hardware NAT table associated with the first hardware NAT pipeline; and
  - refraining from adding the first NAT entry, corresponding to the first dataflow, to one or more other hardware NAT tables that are associated with one or more other hardware NAT pipelines that are not to be used for processing the first set of packets corresponding to the first dataflow.

10. The one or more non-transitory computer readable media of claim 9, wherein the operations further comprise:
- receiving a second set of packets corresponding to a second dataflow;
- identifying a second hardware NAT pipeline to be used for processing egress packets of the second set of packets;
- adding a second NAT entry, corresponding to the egress packets of the second set of packets, to a second hardware NAT table associated with the second hardware NAT pipeline; and
- refraining from adding any NAT entry, corresponding to ingress packets of the second set of packets, to any hardware NAT tables, wherein adding the second NAT entry corresponding to the egress packets and refraining from adding any NAT entry corresponding to the ingress packets implement asymmetric NAT for a first period of time.

11. The one or more non-transitory computer readable media of claim 10, wherein the operations further comprise:
- subsequent to the first period of time, adding a third NAT entry, corresponding to the ingress packets of the second set of packets, to a third hardware NAT table associated with a third hardware NAT pipeline.

12. The one or more non-transitory computer readable media of claim 11, wherein adding the third NAT entry to the third hardware NAT table is responsive to determining that one or more of the ingress packets of the second set of packets were received at a port associated with the third hardware NAT pipeline.

13. The one or more non-transitory computer readable media of claim 9, wherein the operations further comprise:
- receiving a second set of packets corresponding to a second dataflow;
- identifying a second hardware NAT pipeline to be used for processing egress packets of the second set of packets;
- adding a second NAT entry, corresponding to the egress packets of the second set of packets, to a second hardware NAT table associated with the second hardware NAT pipeline; and
- adding a third NAT entry, corresponding to the ingress packets of the second set of packets, to a third hardware NAT table associated with a third hardware NAT pipeline;
- adding the third NAT entry, corresponding to the ingress packets of the second set of packets, to a fourth hardware NAT table associated with a fourth hardware NAT pipeline, wherein the third hardware NAT pipeline and the fourth hardware NAT pipeline are candidate NAT pipelines where the ingress packets of the second set of packets may be received; and
- responsive to detecting one or more of the ingress packets of the second set of packets at a particular port associated with the third hardware NAT pipeline:
  - removing the third NAT entry from the fourth hardware NAT table;
  - retaining the third NAT entry in the third hardware NAT table for processing the ingress packets using the third hardware NAT pipeline.

14. A system comprising:
one or more storage devices; and
one or more processors coupled to the one or more storage devices and configured to:
- receive a first set of data packets;
- determine whether a dataflow associated with the first set of data packets meets a hardware-based Network Address Translation (NAT) usage criterion;
- responsive to determining that the dataflow associated with the first set of data packets meets the hardware-based NAT usage criterion:
  - identify a first hardware NAT pipeline for processing the first set of data packets; and
  - add a first NAT entry, corresponding to the dataflow associated with the first set of data packets, to a first hardware NAT table associated with the identified first hardware NAT pipeline;
- receive a second set of data packets;
- determine whether a dataflow associated with the second set of data packets meets a corresponding hardware-based NAT usage criterion selected from: the hardware-based NAT usage criterion or an additional hardware-based NAT usage criterion; and
- responsive to determining that the dataflow associated with the second set of data packets meets the corresponding hardware-based NAT usage criterion:
  - identify a second hardware NAT pipeline for processing the second set of data packets; and
  - add a second NAT entry, corresponding to the dataflow associated with the second set of data packets, to a second hardware NAT table associated with the identified second hardware NAT pipeline.

15. The system of claim 14, wherein the one or more processors are configured to:
- subsequent to adding the first NAT entry to the first hardware NAT table:
  - determine whether the dataflow associated with the first set of data packets meets the hardware-based NAT usage criterion;
  - responsive to determining that the dataflow associated with the first set of data packets no longer meets the hardware-based NAT usage criterion, remove the first NAT entry from the first hardware NAT table.

16. The system of claim 14, wherein the first and second data packets are ingress and egress data packets of the same dataflow, respectively.

17. The system of claim 14, wherein the hardware-based NAT usage criterion is based on dataflow characteristics.

18. The system of claim 14, wherein the hardware-based NAT usage criterion defines a minimum number of packets during a prior time interval and wherein the first NAT entry is added to the first hardware NAT table based on a number of packets for the dataflow associated with the first set of data packets exceeding the minimum number of packets during the prior time interval.

19. The system of claim 14, wherein the second hardware NAT pipeline is not used for processing the first set of data packets and wherein the second hardware NAT pipeline excludes the first NAT entry.

20. The system of claim 14, wherein the one or more processors are configured to re-evaluate, periodically or in response to a triggering event, whether the dataflow associated with the first set of data packets meets the hardware-based NAT usage criterion.

* * * * *